United States Patent
Natarajan et al.

[11] Patent Number: 5,793,985
[45] Date of Patent: Aug. 11, 1998

[54] METHOD AND APPARATUS FOR BLOCK-BASED MOTION ESTIMATION

[75] Inventors: Balas K. Natarajan, Los Gatos; Vasudev Bhaskaran, Mountain View, both of Calif.

[73] Assignee: Hewlett-Packard Company, Palo Alto, Calif.

[21] Appl. No.: 663,428

[22] Filed: Jun. 17, 1996

[51] Int. Cl.$^6$ .............................. H04N 1/00; H04N 1/41
[52] U.S. Cl. ................ 395/200.77; 348/390; 348/402; 348/407; 348/416
[58] Field of Search ................ 395/200.77; 348/384, 348/390, 401, 402, 407, 412, 413, 415, 416, 420; 382/166, 232, 236, 248; 364/715.02

[56] References Cited

U.S. PATENT DOCUMENTS

| | | | |
|---|---|---|---|
| 5,272,529 | 12/1993 | Frederiksen | 358/133 |
| 5,379,351 | 1/1995 | Fandrianto et al. | 382/41 |
| 5,438,374 | 8/1995 | Yan | 348/620 |
| 5,512,956 | 4/1996 | Yan | 348/606 |
| 5,535,288 | 7/1996 | Chen et al. | 382/236 |
| 5,594,813 | 1/1997 | Fandrianto et al. | 382/236 |
| 5,612,746 | 3/1997 | Slavin | 348/420 |
| 5,654,762 | 8/1997 | Slavin et al. | 348/420 |

Primary Examiner—James P. Trammell
Assistant Examiner—Patrick Assouad

[57] ABSTRACT

This disclosure provides a method of block-based motion estimation used in video compression. The compression process, derives change data for a new frame of data (with respect to a reference frame) by first dividing the frame structure into data tiles (or data blocks) of identical size. Each tile in the new frame is compared to a localized window (about the tile's expected position) in the reference frame to search for a best fit, and thereby provide motion data for the particular tile. Once the best fit is determined, motion-compensated difference data is determined, and stored with the motion data for each tile to complete the process. To achieve computation efficiency, each tile under analysis is preferably converted to single-bit value data and searching and comparisons are performed based on such transformed single-bit data. The single-bit data is computed by convolving the original image data with a low-pass filter to obtain a threshold matrix. The original image data is then compared with the threshold matrix, and converted to single-bit values in dependence on whether the values of the data exceed counterparts in the threshold matrix. Comparison is performed using an exclusive-or function and bit-summation of results.

19 Claims, 5 Drawing Sheets

44 — BEGIN WITH FRAME x, DATA BLOCK "F" AND BLOCK SIZE pxq

CONVOLVE DATA WITH LOW-PASS FILTER "K" OF SIZE 17x17

$$k_{i,j} = \begin{cases} 1/25 & \text{IF } i=1 \text{ (mod 4)} \text{ and } j=1 \text{(mod 4)} \\ 0 & \text{OTHERWISE} \end{cases}$$

TO OBTAIN pxq THRESHOLD MATRIX "T"

COMPARE ORIGINAL DATA WITH THRESHOLD MATRIX AND RESPONSIVELY GENERATE GROUP "W" OF SINGLE BIT VALUES $$w_{i,j} = \begin{cases} 1 & \text{IF } f_{i,j} \geq t_{i,j} \\ 0 & \text{OTHERWISE} \end{cases}$$

RETURN

```
 0   0   0   0   0   0   0   0   0   0   0   0   0   0 254 254
 0   0   0   0   0   0   0   0   0   0   0   0   0   0 254 254
 0   0   0   0   0   0   0   0   0   0   0   0   0   0 254 254
 0   0   0   0   0   0   0   0   0   0   0   0   0 254 254 254
 0   0   0   0   0   0   0   0   0   0   0   0   0 254 254 254
 0   0   0   0   0   0   0   0   0   0   0   0   0 254 254 254
 0   0   0   0   0   0   0   0   0   0   0   0   0 254 254 254
 0   0   0   0   0   0   0   0   0   0   0   0   0 254 254 254
 0   0   0   0   0   0   0   0   0   0   0   0 254 254 254 254
 0   0   0   0   0   0   0   0   0   0   0   0 254 254 254 254
 0   0   0   0   0   0   0   0   0   0   0 254 254 254 254 254
 0   0   0   0   0   0   0   0   0   0   0 254 254 254 254 254
 0   0   0   0   0   0   0   0   0 254 254 254 254 254 254 254
 0   0   0   0   0   0   0   0 254 254 254 254 254 254 254 254
 0   0   0   0   0 254 254 254 254 254 254 254 254 254 254 254
254 254 254 254 254 254 254 254 254 254 254 254 254 254 254 254
```

```
0 0 0 0 0 0 0 0 0 0 0 0 0 0 1 1
0 0 0 0 0 0 0 0 0 0 0 0 0 0 1 1
0 0 0 0 0 0 0 0 0 0 0 0 0 0 1 1
0 0 0 0 0 0 0 0 0 0 0 0 0 1 1 1
0 0 0 0 0 0 0 0 0 0 0 0 0 1 1 1
0 0 0 0 0 0 0 0 0 0 0 0 0 1 1 1
0 0 0 0 0 0 0 0 0 0 0 0 0 1 1 1
0 0 0 0 0 0 0 0 0 0 0 0 0 1 1 1
0 0 0 0 0 0 0 0 0 0 0 0 1 1 1 1
0 0 0 0 0 0 0 0 0 0 0 0 1 1 1 1
0 0 0 0 0 0 0 0 0 0 0 1 1 1 1 1
0 0 0 0 0 0 0 0 0 0 0 1 1 1 1 1
0 0 0 0 0 0 0 0 0 1 1 1 1 1 1 1
0 0 0 0 0 0 0 0 1 1 1 1 1 1 1 1
0 0 0 0 0 1 1 1 1 1 1 1 1 1 1 1
1 1 1 1 1 1 1 1 1 1 1 1 1 1 1 1
```

METHOD AND APPARATUS FOR BLOCK-BASED MOTION ESTIMATION

The present invention relates to data compression and, in particular, provides a method and apparatus for block-based motion estimation usable in image sequence compression.

BACKGROUND

"Video" employs multiple, sequential static images to recreate movement; when each image frame is shown in sequence, at the proper interval, motion is reproduced in a manner that it appears uninterrupted to the human eye. Digital video uses numbers to represent the intensity of each pixel, or smallest picture element of each image frame. Since each image frame includes tens of thousands of pixels (not accounting for other, related information, such as color and sound, for example), and a conventional "NTSC" video sequence includes thirty frames per second, it can be readily seen that substantial digital memory must be devoted to storing a sequence of image frames. It has long been an object of digital video to develop effective mechanisms for image sequence compression, so that less memory is required to store video, and so that video can be easily compressed or transmitted in real time (potentially over modem, for example).

Conventional image sequence compression techniques take advantage of the fact that images do not typically change very much between frames, even though some movement of objects may occur when an image frame is compared to an immediately prior frame. To this effect, the usual goal of image sequence compression is, presuming that a prior image has already been received by a target, to transmit only those movements or changes that permit accurate reconstruction of the subsequent image frame from the prior frame. Using such image sequence compression has permitted vast computation and memory savings, for example, by reducing the quantity of numbers transmitted by a factor of four, or better.

Various different standards of image sequence compression have been developed, often based on block-matching methods. Block-matching methods generally divide a new frame (which is to be compressed) into a structure of tiles, and then derive (a) motion data and (b) motion-compensated difference data for each tile based upon a set of data (in a prior frame) which is similar to the tile; the new frame is completely divided into contiguous tiles, whereas the prior frame is searched for sets of pixels that best match each tile. In this manner, upon reproduction, a new image is formed simply by accessing and manipulating portions of the prior image frame which, once decoded, is retained in digital memory for this purpose. The motion data represents an amount of movement that repositions a suitable part of the prior image frame (most like a particular tile or data block) in order to reconstruct the particular tile, and the motion-compensated difference data represents intensity adjustments that are made to individual pixels within the "borrowed" set of data to accurately reproduce the particular tile in question. Typical implementations of present-day image sequence compression standards such as "H.261," "H.263" and "MPEG" employ block-based image compression.

Significant computational resources are required to implement typical block-based compression methods, such as those just described. For example, since each pixel value contains eight-bit gray scale data, not to mention luminance, hue and saturation data, the repeated comparison of tiles in the new frame with different sets of pixels in the prior frame (to find a suitable set of pixels in the prior frame) can be very taxing in computational terms, and thus very difficult to perform in real-time.

A definite need exists for a method of block-based data compression which can be performed without requiring eight-bit intensity comparisons, and which lends itself to real-time video compression. Such a method would achieve substantial computational savings, perhaps enabling improvement in video compression rates by a factor of eight or better. The present invention satisfies these needs, and provides further related advantages.

SUMMARY

The present invention provides for efficient data compression by performing movement analysis based on a reduced number of bits. By converting full-valued data to, ideally, single-bit values to thereby obtain transformed data, and by then performing motion analysis on that transformed data, compression can be effectively performed using a fraction of the amount of time and computational resources that would otherwise be required. In the context of video compression, this facilitates development of practical real-time video compression which can be implemented in a wide variety of digital systems.

One form of the present invention provides a method of compressing data, including selecting a data block in a first frame and applying a function to the data block, to convert multi-bit data in the data block to a first group of data having a reduced number of bits; applying a function to convert multi-bit data from a set of data in a second frame, to therefrom obtain a second group of data having a reduced number of bits, the set being at least as large as the data block in size; and comparing the first group of data with the second group of data to yield an output. This methodology is then repeated to compare different sets of data in the second frame (against the same original data block of the first frame), and the outputs of the comparison then analyzed to determined a best fit. Once the best fit is ascertained, motion data can then be derived which points to a best fit in the prior frame.

In more particular features of the method of the invention, once motion-compensated difference data is computed for the data block (correcting the best fit to be a near-perfect match) and the process is repeated for each data block or tile in the first frame, information can then be obtained which permits one frame to be completely reassembled from a prior frame. This method is particularly suitable to compression of video.

In further features of the method summarized above, transformation of data to single-bit values can be accomplished by applying a filter to the data blocks. Preferably, this aspect of the invention uses square blocks of video pixels (sixteen-by-sixteen pixel tiles of a video frame) and convolves them with a low-pass filter, such that a threshold matrix is developed. The threshold matrix obtained by this process can then be used for boolean (i.e., greater-than and less-than) comparison with the original data block, and a single-bit representation of each data block thereby created. Using this procedure permits transitions in the image being compressed to be detected and represented by ones and zeros, and block-based searching to be performed based on representations of transitions only, further simplifying processing requirements.

Second and third forms of the invention are also disclosed herein. In particular, a second form of the invention provides an apparatus for performing block-based motion estimation.

This apparatus includes means for converting data in a block of data within a first frame to values having a reduced number of bits, means for converting data in a search window in a second frame to values having a reduced number of bits, and means for comparing the values, for analyzing the results to select a best fit, and for producing motion data. All of these means include software that performs the functions indicated in the detailed description, below, as well as firmware, hardware or similar implementations that perform substantially the same functions, and equivalents of these structures. Finally, a third form of the invention provides software, and computer-readable media containing that software, which perform block-based motion estimation.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

In FIG. 3, the ball has moved somewhat relative to the image presented by FIG. 2, as indicated by an outline in FIG. 3. FIG. 3 also shows a hypothetical tiling of data blocks superimposed on the image of FIG. 3, for purposes of compressing the image data of FIG. 3.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a method and apparatus for block-based motion estimation, namely one which applies a single-bit transformation and performs block-based motion estimation using resultant single-bit values. The invention, however, may also be applied to other types of systems as well.

I. Overview of Operation of the Preferred Software.

In accordance with the principles of the present invention, the preferred embodiment includes video compression software that controls a digital system to perform block-based motion estimation. Eventual decompression of an image, while important to understanding the nature and purpose of the preferred embodiment, is relatively easily performed without requiring substantial processing resources. Initial compression of the image, by contrast, requires searching for possible block movement in different directions, and other complex calculations, and imposes substantial processing and time restrictions upon the compression mechanism. The present embodiment includes video compression software that uses relatively little computing power to perform such compression.

Digital video is often stored and transmitted in compressed form conforming to the "MPEG," "H.261" or "H.263" standards for motion sequences. Implementation of these standards typically utilize block-based motion estimation as a technique for exploiting the temporal redundancy in a sequence of images, thereby achieving increased compression. The simplest abstraction of the motion estimation problem is as follows; given a source block of size (b×b) pixels in a target image that is to be compressed, and a search window of size (b+m)×(b+m) in a reference image that will have already been decompressed prior when reassembling the target image, it is desired to find the (b×b) sub-block of the search window that most closely resembles the source block.

Figure 1:
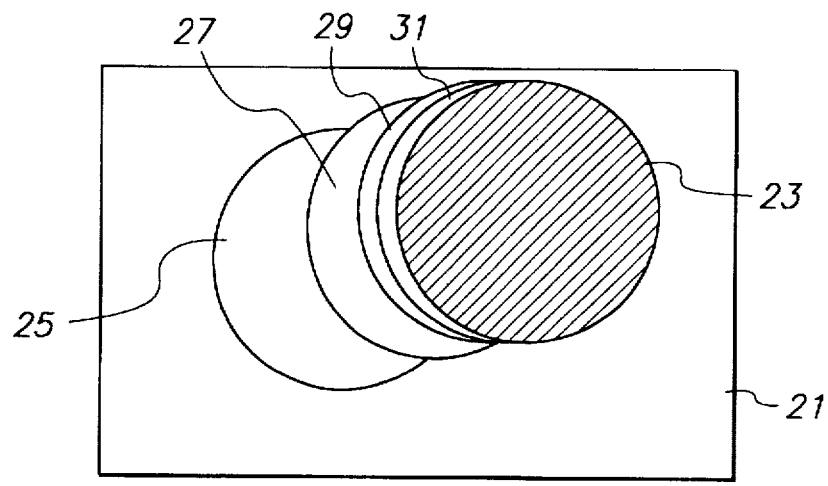
FIG. 1 presents an image sequence of a ball in flight.
Figure 2:
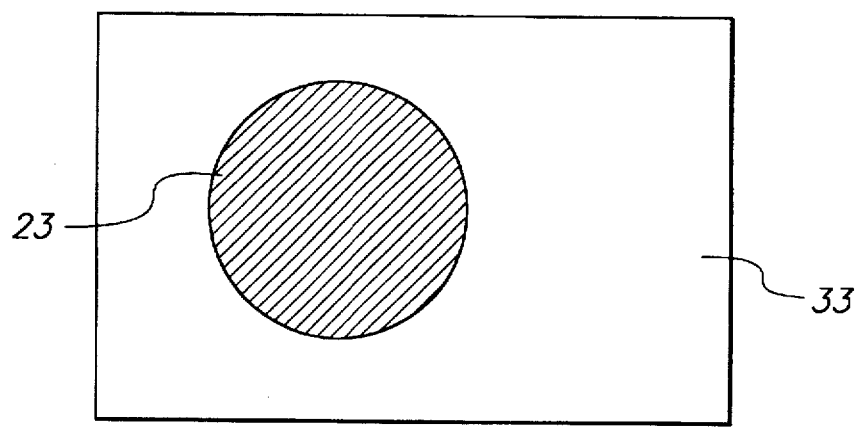
FIG. 2 presents a first image frame of the sequence of FIG. 1.
Figure 3:
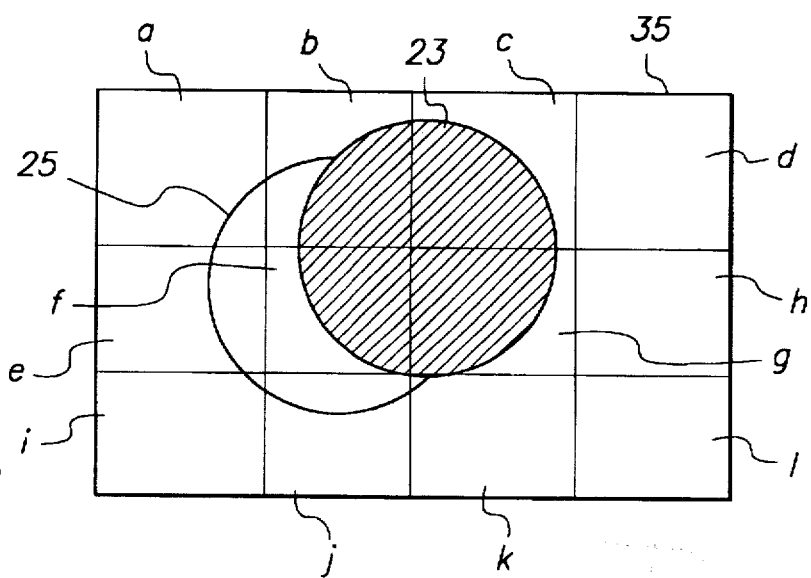
FIG. 3 presents a second image frame of the sequence of FIG. 1.

FIGS. 1–3 show a hypothetical sequence of a ball 23 in flight (which might be observed, for example, on a television screen), and will be used to explain motion estimation as implemented by the preferred software. In particular, FIG. 1 shows plural outlines 25, 27, 29 and 31 of the ball 23, which is traveling from left-to-right; each of the outlines represents a different image frame. The preferred software is to be used to compress frame; however, for purposes of explanation, only the images represented by the first two outlines (25 and 27) of FIG. 1 will be used to explain motion estimation according to the preferred software. Compression of the remaining images utilizes the same process in an inductive manner (e.g., compression of the second frame based on the first frame, the third frame based on the second frame, the fourth frame based on the third frame, and so-on).

FIGS. 2 and 3 show first and second images 33 and 35 corresponding to the first two outlines 25 and 27. In particular, the first image 33 seen in FIG. 2 will be taken as a source image. By contrast, the image 35 of FIG. 3 (which also shows an outline 25 corresponding to the first image) is a target image which is to (1) be compressed based on the image 33 of FIG. 2, and (2) be reassembled based upon the image 33 of FIG. 2, which will have already been decompressed when it is time to decompress the image 35 of FIG. 3. The black solid ball 23 in each of FIGS. 2 and 3 indicates the present position of the ball with respect to that image.

In processing frames of data, the preferred software divides the target frame 35 (FIG. 3) into a number of square tiles, or data blocks of (b×b) pixels, where preferably b=16. Whereas a "NTSC" standard video frame is about (720× 512) pixels in size (and would therefore include several hundred such tiles), only twelve tiles have been shown in FIG. 3 for ease of illustration; these twelve tiles are indicated by reference numerals "A"–"L." The present discussion focuses on estimating motion for one such tile (or "data block"), which will be taken to be the tile "G" seen in FIG. 3. In accordance with typical block-motion estimation processes, FIG. 2 will be searched, using tile "G" for comparison, until a "best match" is found in FIG. 2. Motion-compensated intensity differences between the best fit and tile "G" are then computed, and the process is repeated for the remaining tiles of FIG. 3, to completely compress the image FIG. 3.

One computational shortcut which is implemented in the preferred embodiment of the present invention is searching for a best fit within only a small window, which is larger in size than the tile "G" and centered about an expected location of tile "G." That is to say, since sequential frames do not typically change very much, it will be assumed that a "best fit" for tile "G" in FIG. 2 ought to be near the position of tile "G" in FIG. 3, relative to the other tiles "A"–"L." Consequently, in processing tile "G" (as well as for each tile in FIG. 3), the preferred embodiment searches for a "best fit" within a window (or "set") of only (31×31) pixels in FIG. 2.

Figure 4:
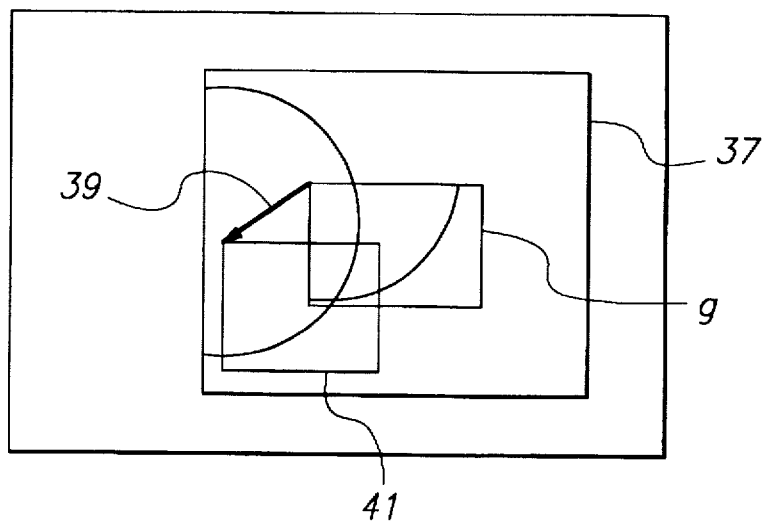
FIG. 4 illustrates relative location of the "best fit" found in the image of FIG. 2 with respect to a tile "G" of FIG. 3.

The results of motion estimation for tile "G" are pictorially indicated by FIG. 4, which shows in overlapped form all of (1) the tile "G," (2) a window 37 of (31×31) pixels which is centered about the expected location of a best fit, and (3) the best fit 41 itself. A movement vector 39 indicates the relative location between the tile "G" and the best fit 41 which has been located as a result of searching.

To efficiently search for the best fit 41, the software of the preferred embodiment converts each of tile "G" and all data falling within the window 37 to single-bit values for computation savings. That is to say, whereas the original intensity data for each frame includes eight or more bits of data (thereby rendering comparison between the tile and data in the window a labor-intensive process), the preferred software first transforms the data to single-bit values to emphasize transitions in intensity, and then performs comparison based on the transformed, single-bit values.

Once each of the tile "G" and the entire window are converted to single-bit data, the preferred software compares the tile "G" with, sequentially, each (16×16) set (or sub-block) of single-bit data corresponding to the window 37, and stores the result of each comparison. For each particular (16×16) sub-block, comparison is performed in a convenient manner (from a design standpoint) by performing a sixteen-bit exclusive-or function, row by row, between single-bit data for the tile "G" and for the particular sub-block of corresponding size, and bit-summing and accumulating the results of the exclusive-or function in a accumulation register. Preferably, since the tile "G" is a (16×16) block of pixels, each sub-block from the window 37 is also (16×16) group of single-bit data. The number of operations required for a comparison of one tile with each set of data therefore depends on the number of operations registers used, i.e., sixteen sequential uses of one sixteen-bit register, two sequential uses of eight parallel sixteen-bit registers, etc. Additional detail regarding the preferred comparison procedure is provided in connection with a specific example below.

The results of the comparisons are stored in a memory block and, once all (16×16) sets of data within the window have been used for comparison, the software interrogates memory to determine a minimum result from all 254 comparison operations (a 31×31 sub-block can have 254 different 16×16 sub-blocks). Based on the location of the minimum within the memory block, the software obtains a pointer which indicates the relative location of the corresponding best fit 41 with respect to the tile "G." For example, if in FIG. 6, the left-hand corner of the best fit from FIG. 2 is at pixel location 300,260, then the motion data is formatted to indicate that the intensity data for tile "G" should be taken from the (16×16) block of data which appeared at location 300,260 in FIG. 2.

Once the single-bit transform and comparison processes have been completed, and the resultant best fit located, computation and compression of motion-compensated difference data is then performed between tile "G" and those pixels of FIG. 2 corresponding to the best fit, simply by subtracting the intensity of the best fit 41 from the tile "G." Computation of motion-compensated difference data is well-known within the field of video compression, and will not be herein be discussed in further detail.

II. Application of the Single-Bit Transform.

Application of the single-bit transform to convert eight bit pixel values from the tile "G" to single-bit values will now be discussed in greater detail, with reference to FIGS. 5–8. The single-bit transform as applied to the window 37 is exactly the same as is applied to the data tile "G," and will not be separately discussed; that is, the same (17×17) low-pass filter "K" is applied to a (17×17) matrix of data having its upper-left corner at row i, column j, to obtain a corresponding threshold value $t_{i,j}$. The next threshold value, $t_{i+1,j}$, is obtained by applying the filter "K" to the (17×17) matrix of data having its upper-left corner at row i+1, column j, and so-forth. In general, alternative means to a single-bit transform can be employed with trade-offs in computation efficiency; for example, software, hardware or firmware can be used to implement a two-bit transform.

Figure 8:
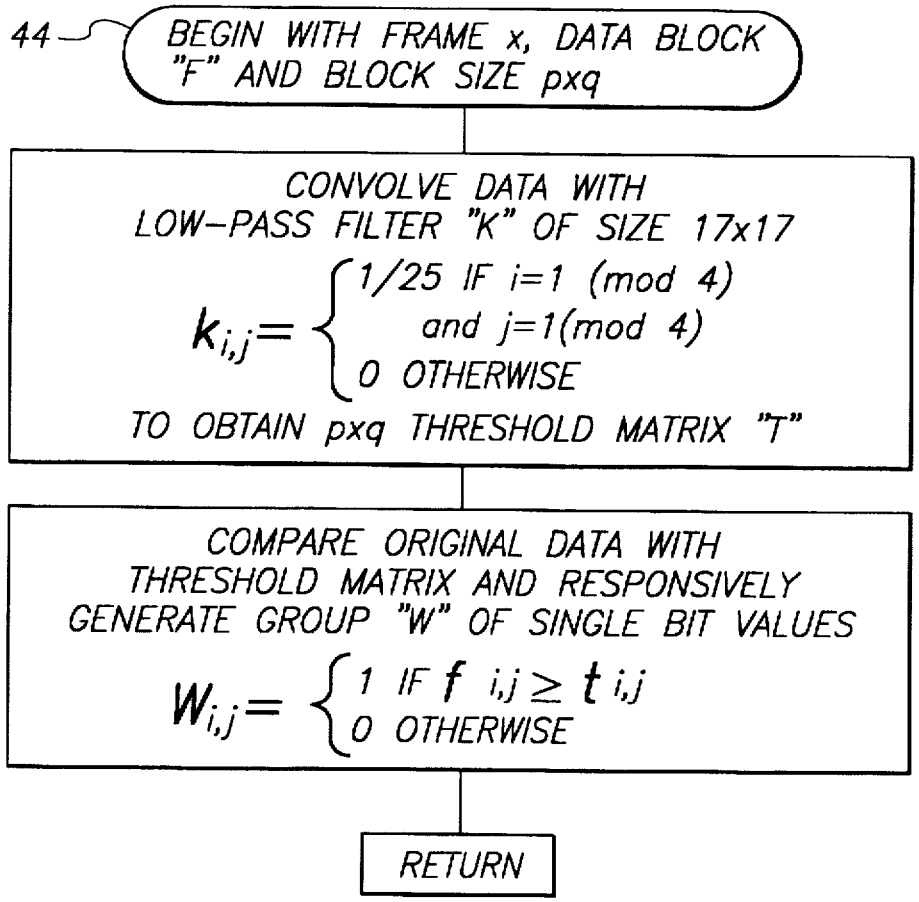
FIG. 8 is a block diagram of the process of applying the preferred single-bit transform.
Figure 5:
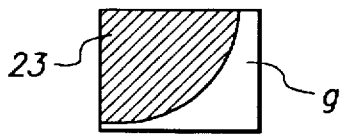
FIG. 5 is a table of eight-bit intensity values associated with the tile "G" of FIG. 3 (reproduced in the upper left hand corner of FIG. 5) for a data block of sixteen pixels by sixteen pixels.
Figure 6:
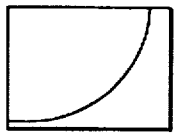
FIG. 6 is the table of FIG. 5, after a single-bit transformation function has been applied to the tile "G" to obtain a first group of single-bit values.
Figure 7:
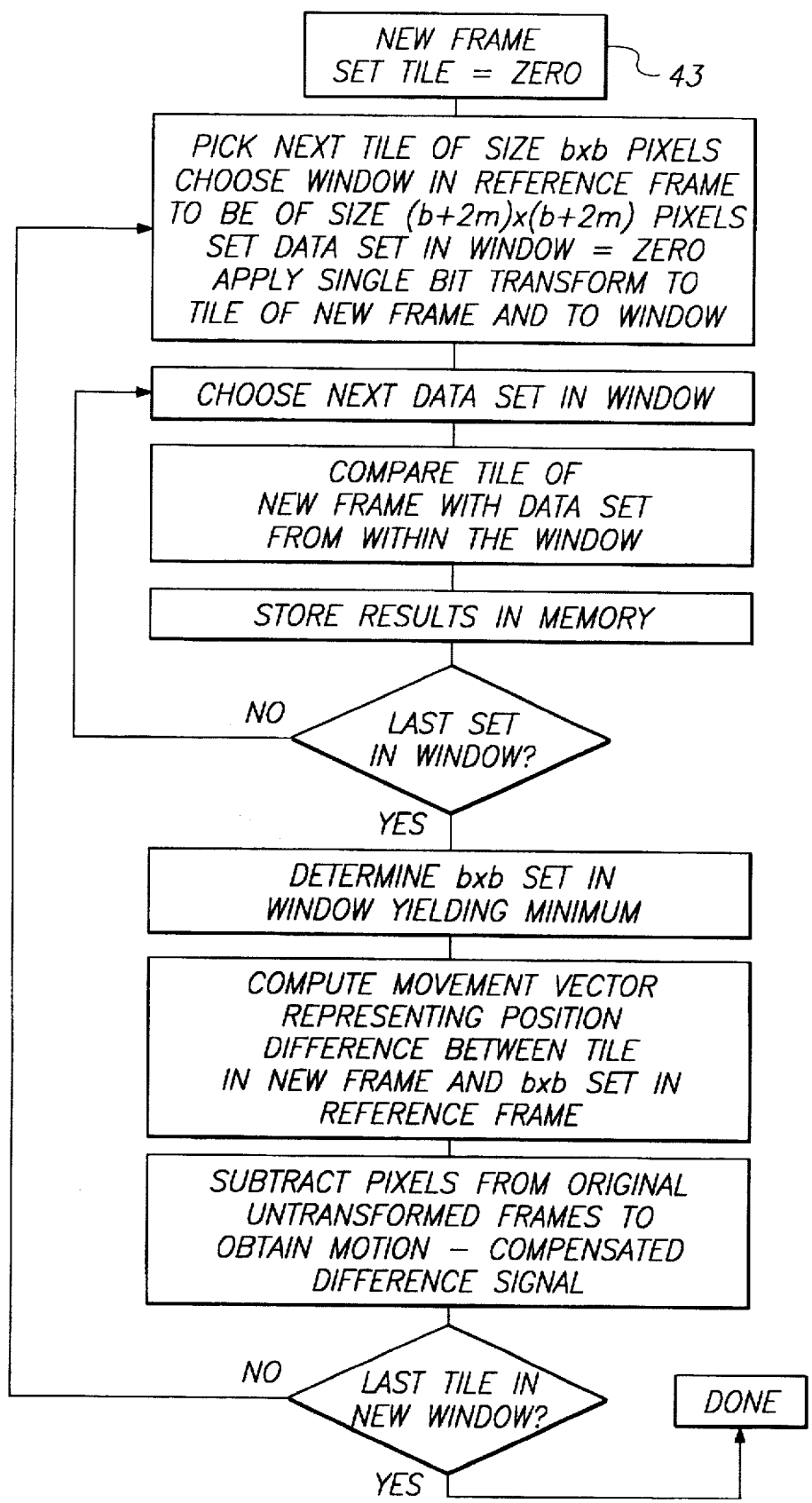
FIG. 7 is a block diagram of the process of obtaining block motion data and motion-compensated difference data according to the preferred embodiment.

FIG. 5 shows a matrix of pixel values for the tile "G." FIG. 6, by contrast, shows a matrix of a first group of single-bit data which has been obtained by applying a single-bit transform to the tile "G" and surrounding data. FIG. 7 is a software block diagram 41 setting forth a block-based procedure as described herein, and FIG. 8 is a software sub-routine block diagram 43 of a subroutine that applies the single-bit transform to data.

The tile "G" is reproduced at the upper left hand of FIG. 5. In general, eight bit intensity values are represented by the number range 0–255, although since the exemplary image in tile "G" includes only part of a purely black ball on a white background, intensity values for the individual pixels have been chosen in FIG. 5 to all be either "254" or "0."

In accordance with the present invention, the preferred software uses means for converting a block of data within the each frame to data having a reduced number of bits; this means includes any software, firmware or hardware implementation that reduces the number of bits, for example, by converting each datum or pixel to a single or two-bit value for purposes of comparison. The single-bit transform implemented by preferred software includes use of a low-pass filter which it convolves with data corresponding to the original tile "G" to thereby obtain a threshold matrix. The particular low-pass filter used is a (17×17) matrix "K," and the convolution results in the filter being applied to data both inside and outside of the tile "G." In this regard, the preferred low-pass filter "K" has values of 0.04 every fourth row and column, and zero otherwise, and it effectively averages each sixteenth pixel to create each entry $t_{i,j}$ of a threshold matrix "T" (which is identical in size to the tile "G" or the window 37, as appropriate) as an output. The preferred filter "K" averages twenty-five data values, hence each fourth row of the filter "K" is selected to be ¹/₂₅, or 0.04. It should be understood, however, that any transform that reduces the number of bits for a block of data can be used in lieu of the preferred single-bit transform, with associated trade-offs in computational efficiency. In fact, while the preferred filter is a (17×17) value matrix, the filter is preferably selected in response to the size of each frame in pixels; that is, if the compression is applied to an image which is smaller or larger than (720×512) pixels, then the filter and its coefficients preferably are also correspondingly adjusted in size.

The threshold matrix "T" is described mathematically below, where "F" is used to represent a (17×17) block of data having its upper left corner at row i and column j of the image in question (FIG. 2 or FIG. 3, using the present example) and the values x and y each range from 0 to 15.

$$T_{i,j} = \Sigma_x \Sigma_y K_{x,y} F_{i+x,j+y}$$

$$T_{i,j} = \begin{matrix} t_{i,j} & t_{i+1,j} & t_{i+2,j} & \cdots & t_{i+15,j} \\ t_{i,j+1} & t_{i+1,j+1} & t_{i+2,j+1} & \cdots & t_{i+15,j+1} \\ \cdots \\ \cdots \\ \cdots \\ t_{i,j+15} & t_{i+1,j+15} & t_{i+2,j+15} & \cdots & t_{i+15,j+15} \end{matrix}$$

Applying the matrix "K" to the tile "G" in FIG. 4, $t_{i,j}$ (the upper-left-most threshold value, corresponding to the upper-left pixel of tile "G") is computed as set forth below.

$$t_{i,j} = \frac{1}{25} |f_{1,1} + f_{5,1} + f_{9,1} + f_{13,1} + f_{17,1} + f_{1,5} + f_{5,5} + \ldots f_{17,17}| = 91.44$$

By contrast (presuming that all values of the adjacent tile "H" have an eight-bit intensity of "254"), the upper-right-hand-most threshold value, corresponding to the upper-right pixel of tile "G" is given as follows.

$$t_{i+15,j} =$$

$$\frac{1}{25} |f_{16,1} + f_{20,1} + f_{24,1} + f_{28,1} + f_{32,1} + f_{16,5} + f_{20,5} + \ldots f_{32,17}| = 254$$

As can be seen, the convolution between "F" and the filter "K" results in use, not only data falling within the tile "G" or the window 37 to the filter "K," but in data falling outside of these boundaries as well.

Once all elements $t_{i,j}$ of the threshold matrix "T" have been computed, a boolean comparison is then performed between the original data, e.g., the tile "G" or the window 37, and the threshold matrix "T," to determine whether, on a pixel-by-pixel basis, the intensity values are greater than or equal to corresponding threshold values.

Using the example provided by FIG. 5, application of the upper-left-most pixel of tile "G" ($f_{i,j}$, having an eight-bit value of "0") to determine whether it is greater than or equal to $t_{i,j}$ (having a value of 91.44) results in a "false" boolean output. Consequently, a first group W1 of single-bit values obtained from the comparison output will be a single-bit matrix having an upper-left-most value of "0." By contrast, with respect to the upper-right-most pixel of tile "G" ($f_{i+15,j}$, having a value of "254"), its comparison with $t_{i,j}$ (having a value of "254") results in a "true" boolean output. Consequently, "W1" will have an upper-right-most value of "1."

FIG. 6 presents the entire first group of data, "W1," once the single-bit transform has been completely applied to the tile "G" to yield a (16×16) matrix of single-bit values.

The same single-bit transform process is then applied to the pixels falling within and around the window 37, and from this single-bit value data, a sub-block of (16×16) single-bit data, "W2," is taken as a second group. A comparison is then performed between the two (16×16) single-bit data groups, "W1" and "W2," and the results stored in the memory block. The comparison process is preferably performed using a microprocessor's built-in sixteen-bit registers, or alternatively, using a separate, external exclusive-or chip. For example, as indicated in FIG. 6, the first row of single-bit value data includes the following values:

$W1_{x,1} = 0\ 0\ 0\ 0\ 0\ 0\ 0\ 0\ 0\ 0\ 0\ 0\ 0\ 0\ 1\ 1.$

In comparing "W1" against each (16×16) single-bit group corresponding to data sets from the window 37, each row of "W1" is loaded into a register, and an exclusive-or function is used to compare a corresponding row of "W2." The ones resulting from this exclusive-or procedure are summed together and accumulated in another, second register until all 16 rows have been processed. For example, if the first row of "W2" were identical to the first row of "W1," then the result for $W1_{x,1}$ would be "0." By contrast, if two different bit positions differed between the first rows of "W1" and "W2," then the result would be "2." Once all 16 rows have been processed and summed together, the resultant sum is removed from the second register and stored in the memory block. The particular memory location in which the sum is stored is preferably a location indexed by row i and column j of the position of the group "W2" with respect to the window 37.

In other words, "W2" is first taken during the searching process to be the (16×16) group of single-bit value data corresponding to the upper-left corner of the window 37, i.e., rows 1–16, columns 1–16 of the window, and the comparison results stored in a first memory location. Then, the process is repeated, with "W2" being taken to be a second (16×16) group of single-bit value data near the upper-left corner of the window 37, i.e., rows 1–16 and columns 2–17, and the comparison results stored in a second memory location. This process is repeated until a final comparison for tile "G" is made by taking "W2" to be rows 16–31, columns 16–31 of the window 37, and the results stored in a final, 254th memory location. The preferred software then interrogates all of the memory locations to determine the minimum sum obtained from the comparison process and, based upon the position of that sum in memory block, the software obtains an pointer to the location of the best fit in FIG. 2 for tile "G."

Additional details regarding the operation of the preferred software can be obtained by referring to an attached software block diagram 43, seen in FIG. 7, and an attached subroutine diagram 44, seen in FIG. 8.

III. System Implementation.

Figure 9:
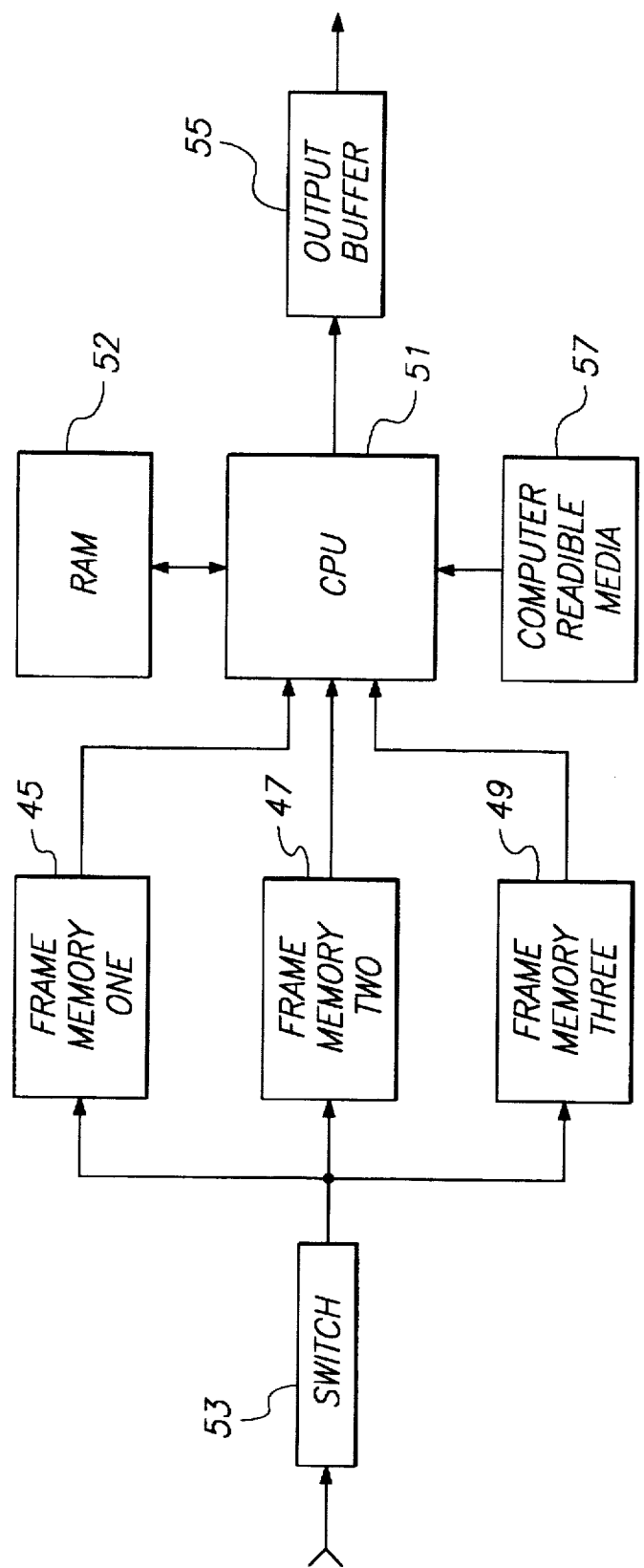
FIG. 9 is a block diagram of an embodiment that relies upon software stored on computer-readable media.

FIG. 9 shows one embodiment of a complete system controlled by the preferred software. In particular, each frame of digital images is stored in one of three interleaved frame memories 45, 47 and 49 for processing by a CPU 51; no more than two of the frame memories are being used by a CPU 51 at any one time. A digital switch 53 is used to direct a new, incoming frame of data to a contemporaneously unused one of the three interleaved frame memories, thereby overwriting prior frame data which has already been compressed and used to compress the next subsequent frame.

In the case of the images of FIGS. 2 and 3, for example, the first image 33 (FIG. 2) might be stored in a first one of the frame memories 45, while the second image 35 would be stored in a second one of the frame memories 47. The CPU 51 would access data from each of these frames to perform image sequence compression, using block-based estimation according to the preferred software, and would store compressed data obtained in an output buffer 55. During this time, the digital switch 53 facilitates real-time video compression by loading digitized data representing the new, incoming frame into a third one of the frame memories 49, which is not currently being used by the CPU 51. As the data is being processed, transformed, single-bit data is stored by the CPU 51 in a separate random access memory (RAM) 52.

Once compression of the image 35 (FIG. 3) is completed, the CPU 51 immediately may begin compressing a next frame (represented by a third outline 29 of FIG. 1) of data by comparing the second and third frame memories 47 and 49, while the digital switch 53 loads another new frame of digital data into the first one of the frame memories 45, thereby overwriting the image of FIG. 2, and so-on. The preferred software which controls the CPU 51 to perform these functions is stored on computer readable media 57, which may include firmware, floppy disks, magnetic tapes, optical disks, compact disks, or any other mechanism that stores computer-readable information.

What has been described is a preferred system for performing block-based motion estimation usable in image sequence compression. From the foregoing, various modifications, improvements and extensions of the preferred software will occur to those of ordinary skill in the art. For example, the preferred implementation could be modified so as to function on a single integrated circuit, or upon a digital system not including a CPU. Alternatively, the compression methods described herein could be used to compress sound or other data, instead of or in addition to image data. As yet another example, the present invention may be applied to convert eight-bit or other intensity data to two-bit value data, for purposes of performing motion estimation based on such two-bit data. Various alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

We claim:

1. In a system that compresses multi-bit data that is in the form of sequential frames of data, the system analyzing a first frame and a second frame and deriving changes therebetween to thereby permit reconstruction of the second frame from the first frame, a method of block-based motion estimation, comprising:

(a) selecting a data block in the first frame;
   (b) applying a function to convert multi-bit data in the data block to a first group of data having a reduced number of bits;
   (c) applying a function to convert multi-bit data in the second frame to data having a reduced number of bits;
   (d) comparing the first group of data with data from the second frame having a reduced number of bits to yield an output;
   (e) repeating (c)–(d) to compare the same first group of data with different groups of data from the second frame (corresponding to different sets of data in the second frame);
   (f) comparing the outputs of (d) with each other and responsively selecting a particular set of data in the second frame which corresponds to a best fit of the data block within at least a portion of the second frame; and
   (g) in response to the best fit, deriving motion data that corresponds to motion of data in the data block between the first and second frames.

2. A method according to claim 1, wherein applying a function to convert multi-bit data includes:
   converting multi-bit data to single-bit data based upon a comparison of each multi-bit datum with a threshold.

3. A method according to claim 1, wherein applying a function to convert multi-bit data includes:
   applying a low-pass filter to the data and developing a threshold matrix therefrom, and converting data based upon a comparison of individual pixel intensity values with corresponding threshold values from the threshold matrix.

4. A method according to claim 1, wherein the frames are image frames and the data includes pixels representing intensity data in two spatial dimensions, and wherein:
   selecting a data block includes selecting a block of pixels;
   applying a function to convert multi-bit data in the data block includes converting multi-bit data to a first group of single-bit value data;
   applying a function to convert multi-bit data in the second frame includes converting multi-bit data to single-bit value data; and
   repeating (c)–(d) includes comparing data to match the block of pixels against different sets of pixels corresponding to at least a portion of the second frame.

5. A method according to claim 1, wherein the frames are frames of visual data, the multi-bit data includes multi-bit intensity data, and the data block represents a two-dimensional block of pixels at a predefined position within the first frame, and wherein:
   said method further comprises selecting a window in the second frame, the window chosen to be larger in size than the data block;
   selecting data in the second frame includes selecting a set of data to lie within the window; and
   repeating includes sequentially searching different sets of pixels within the window, each set identical in size and two-dimensional shape to each other and to the block.

6. A method according to claim 5, wherein deriving motion data includes:
   producing a two-dimensional motion vector to represent position in the second frame of a best fit of the data block with respect to the first frame.

7. A method according to claim 5, wherein said method uses a digital register, and the two-dimensional block is a square block of sixteen pixels by sixteen pixels, and wherein comparing the first group of data with data from the second frame includes:
   sequentially performing an exclusive-or function between the first group and data from the second frame having a reduced number of bits using the register; and
   selecting the best fit to be a set of data from the second frame having a reduced number of bits that yields a minimum value from the exclusive-or function.

8. A method according to claim 7, wherein:
   developing a threshold value includes developing a set of threshold values from the data block by applying a low-pass filter to the data block.

9. A method according to claim 8, wherein the data block represents a pixel matrix of size n by m where n and m are integers and wherein:
   developing a set of threshold values includes developing a threshold matrix by convolving a low-pass matrix of approximate size n by m with the pixel matrix; and
   transforming each datum includes comparing the multi-bit value of each datum in the pixel matrix with a corresponding value in the threshold matrix, and in response to the comparison, converting the multi-bit value of each datum in the pixel matrix to one of a logical true and false to thereby generate the single bit data of the first group.

10. A method according to claim 9, wherein m equals n and wherein:
    developing a threshold matrix includes developing a threshold matrix that is a n by n square matrix.

11. A method according to claim 9, wherein:
    developing a low-pass matrix includes developing a low-pass matrix having a values of approximately 0.04 every fourth row and every fourth column, and zero otherwise.

12. A method according to claim 9, wherein:

transforming each datum includes comparing multi-bit value data from the pixel matrix with corresponding data in the threshold matrix, and forming the first group to be a matrix having a value of one for each multi-bit value datum that is greater than a corresponding datum in the threshold matrix, and a zero for each datum that is less than a corresponding datum in the threshold matrix.

13. An apparatus, comprising:

a first memory that stores multi-bit data from a first frame;

a second memory that stores multi-bit data from a second frame; and means coupled to the first memory for converting a block of data within the first frame to values having a reduced number of bits;

means coupled to the second memory for converting data in a search window in the second frame to values having a reduced number of bits, the search window selected be larger in size than the block; and means for comparing the values corresponding to the block with the values corresponding to the search window, for analyzing results of the comparing to select a group of data in the search window that provides a best fit for the data of the data block, and for producing motion data indicating location of the best fit.

14. An apparatus including machine readible instructions and computer-readable media on which the instructions are stored, for use in a system that compresses multi-bit data that is in the form of sequential frames of data, the system analyzing a first frame and a second frame and deriving changes therebetween to thereby permit reconstruction of the second frame from the first frame, the instructions when executed causing the system to:

(a) select a data block in the first frame;

(b) apply a function to convert multi-bit data in the data block to a first group of data having a reduced number of bits;

(c) apply a function to convert multi-bit data falling within at least a window of data from the second frame to data having a reduced number of bits, and selecting therefrom a second group of data which corresponds in size to the data block;

(d) compare the first group of data with the second group of data to yield an output;

(e) repeat (c)–(d) for different sets of data in the second frame which have already been converted in (c) to data having a reduced number of bits;

(f) compare the outputs of (d) with each other and responsively select a particular set of data in the second frame which corresponds to a best fit of the data block in at least a portion of the second frame; and (g) in response to the best fit, derive motion data that corresponds to motion of data in the data blocks between the first and second frames.

15. An apparatus according to claim 14, wherein the instructions when executed cause the system to:

perform (b) by converting pixel intensity values to single-bit value data; and perform (c) by converting pixel intensity values to single-bit value data.

16. An apparatus according to claim 15, wherein converting pixel intensity values to single-bit value data includes:

applying a low-pass filter to pixel intensity values to yield therefrom a threshold matrix, the threshold matrix having plurality of individual thresholds; and comparing individual pixel intensity values with corresponding individual thresholds, and as a result of comparing, generating a matrix of single-bit value data, with each datum representing a result of comparison between a pixel intensity value and a corresponding threshold.

17. In a system that compresses multi-bit data that is in the form of sequential frames of data, the system analyzing a first frame and a second frame and deriving changes therebetween to thereby permit reconstruction of the second frame from the first frame, a method of block-based motion estimation, comprising:

(a) selecting a data block in the first frame;

(b) applying a function to transform multi-bit data in the data block to a first group of data having a reduced number of bits, in a manner that emphasizes edge transitions;

(c) applying a function to transform multi-bit data in the second frame to data having a reduced number of bits, in a manner that emphasizes edge transitions;

(d) comparing the first group of data with data from the second frame having a reduced number of bits to yield an output;

(e) repeating (c)–(d) to compare the same first group of data with different groups of data from the second frame (corresponding to different sets of data in the second frame);

(f) comparing the outputs of (d) with each other and responsively selecting a particular set of data in the second frame which corresponds to a best fit of the data block within at least a portion of the second frame, to thereby identify a particular set of data in the second frame which most closely replicates edge transitions falling within the data block; and (g) in response to the best fit, deriving motion data that corresponds to motion of data in the data block between the first and second frames.

18. In a system that compresses multi-bit data that is in the form of sequential frames of data, the system analyzing a first frame and a second frame and deriving changes therebetween to thereby permit reconstruction of the second frame from the first frame, a method of block-based motion estimation, comprising:

(a) selecting a data block in the first frame;

(b) applying a function to convert multi-bit data in the data block to a first group of data having a reduced number of bits;

(c) applying a function to convert multi-bit data in the second frame to data having a reduced number of bits;

(d) comparing the first group of data with data from the second frame having a reduced number of bits to yield an output;

(e) repeating (c)–(d) to compare the same first group of data with different groups of data from the second frame (corresponding to different sets of data in the second frame);

(f) comparing the outputs of (d) with each other and responsively selecting a particular set of data in the second frame which corresponds to a best fit of the data block within at least a portion of the second frame; and (g) in response to the best fit, deriving motion data that corresponds to motion of data in the data block between the first and second frames;

(h) wherein applying a function to convert multi-bit data to at least one of the data block and data from the second frame includes
  developing at least one threshold value, and
  in dependence upon a comparison between multi-bit data and a threshold value, transforming the multi-bit data to a single-bit value data.

19. A method according to claim 18, wherein:
said method further comprises selecting a window of multi-bit data in the second frame, the window chosen to be larger in size than the data block;
selecting data in the second frame includes selecting a set of data from within the window, the set identical in shape and size to the data block;

developing at least one threshold value includes convolving a low-pass matrix of approximate size n by m with data from the second frame, including data in the set;
applying a function to convert multi-bit data in the second frame includes comparing each datum in the set of data with a corresponding threshold value to yield, for each datum in the set, a single-bit value representing a result of the comparison; and
repeating includes repeating (c)–(d) using different sets of data from within the window, each set identical in shape and size to the data block and to each other.

* * * * *